(12) United States Patent  
Mashimo

(10) Patent No.: US 7,170,837 B2  
(45) Date of Patent: Jan. 30, 2007

(54) OPTICAL DISK DEVICE HAVING MEANS FOR GENERATING A TRACKING OFFSET SIGNAL ACCORDING TO LASER DIODE CURRENT OR TEMPERATURE

(75) Inventor: Akira Mashimo, Tokorozawa (JP)

(73) Assignee: TEAC Corporation, Musashino (JP)

( * ) Notice: Subject to any disclaimer, the term of this patent is extended or adjusted under 35 U.S.C. 154(b) by 403 days.

(21) Appl. No.: 10/235,700

(22) Filed: Sep. 5, 2002

(65) Prior Publication Data

US 2003/0048708 A1  Mar. 13, 2003

(30) Foreign Application Priority Data

Sep. 7, 2001  (JP)  ............................. 2001-272052

(51) Int. Cl.
*G11B 7/095* (2006.01)
(52) U.S. Cl. ................................. 369/53.26; 369/44.35
(58) Field of Classification Search ............ 369/44.29, 369/44.35, 53.26, 53.27, 47.49, 53.31, 116, 369/53.1
See application file for complete search history.

(56) References Cited

U.S. PATENT DOCUMENTS

| | | | | |
|---|---|---|---|---|
| 5,210,732 A | * | 5/1993 | Suenaga et al. | 369/44.29 |
| 5,404,346 A | * | 4/1995 | Koyama et al. | 369/44.32 |
| 5,517,475 A | * | 5/1996 | Koyama et al. | 369/44.32 |
| 5,553,040 A | * | 9/1996 | Hanano et al. | 369/44.34 |
| 5,671,209 A | * | 9/1997 | Kamioka et al. | 369/44.37 |
| 5,732,061 A | * | 3/1998 | Kirino et al. | 369/116 |
| 6,195,315 B1 | * | 2/2001 | Takahashi et al. | 369/44.23 |
| 6,243,350 B1 | * | 6/2001 | Knight et al. | 369/126 |
| 6,424,608 B1 | * | 7/2002 | Takeuchi | 369/47.53 |
| 6,545,964 B1 | * | 4/2003 | Takase et al. | 369/47.51 |
| 6,552,972 B1 | * | 4/2003 | Minemura et al. | 369/44.29 |
| 6,614,736 B2 | * | 9/2003 | Morizumi et al. | 369/53.1 |
| 6,643,239 B2 | * | 11/2003 | Nakajo | 369/53.26 |
| 2002/0048237 A1 | * | 4/2002 | Suzuki et al. | 369/44.29 |
| 2004/0027947 A1 | * | 2/2004 | Asano et al. | 369/47.31 |

FOREIGN PATENT DOCUMENTS

| | | |
|---|---|---|
| JP | 7-235072 | 9/1995 |
| JP | 2000-285485 | 10/2000 |
| JP | 2003-36549 | 2/2003 |

* cited by examiner

*Primary Examiner*—Andrea Wellington
*Assistant Examiner*—Peter Vincent Agustin
(74) *Attorney, Agent, or Firm*—Christensen O'Connor Johnson Kindness PLLC

(57) ABSTRACT

An optical disk device capable of data recording. A tracking error signal is generated from return light from an optical disk, and the tracking error signal to which a tracking offset signal is further added is supplied to a tracking servo circuit. A tracking offset signal in accordance with the driving current when recording data is determined based on the relationship between the driving current of the laser diode and the optimum tracking offset. Tracking control is performed using a fixed tracking offset signal when reproducing data and using a tracking offset signal which is variable in accordance with the driving current when recording data.

3 Claims, 4 Drawing Sheets

OPTICAL DISK DEVICE HAVING MEANS FOR GENERATING A TRACKING OFFSET SIGNAL ACCORDING TO LASER DIODE CURRENT OR TEMPERATURE

BACKGROUND OF THE INVENTION

1. Field of the Invention

The present invention relates to an optical disk device, and more particularly to tracking control in an optical disk device which is capable of recording.

2. Description of Related Art

In an optical disk device capable of recording data onto an optical disk, such as a CD-R device, a beam of focused laser light (a laser beam) is irradiated to the optical disk, light reflected from the optical disk is used for generating a tracking error signal, and data is recorded and reproduced while tracking control is conducted based on the tracking error signal. Because when reproducing data a laser beam of reproducing power is irradiated, the reflected light is sampled at predetermined timing to generate a tracking error signal. When recording data, because laser beams of recording power and reproducing power are generated alternately, the reflected light is sampled at the timing of the reproducing power to generate a tracking error signal. In an optical disk device for recording data onto a rewritable optical disk such as a CD-RW, because laser beams of erasing power, recording power, and reproducing power appear sequentially, the reflected light is sampled at the timing of the erasing power to generate a tracking error signal. A tracking error signal can be generated using, for example, the Differential Push Pull (DPP) method.

FIG. 4 shows a relationship between tracks and light spots when a main beam and two sub-beams are focused on an optical disk in the DPP method. The beams are located such that the two sub-beams 102 and 104 sandwich the main beam 100 located in the center. The position of the main beam 100 is shifted from the position of each sub-beam 102 or 104 by half the track pitch in the track width direction. Shown in the drawing is an on-track state, in which the main beam is located on the track n with the sub-beam 102 being located in the middle between the track n and the track n+1 and the sub-beam 104 being located in the middle between the track n and the track n−1. The phases of the sub-beams 102 and 104 are shifted from the phase of the main beam 100, which is used as a reference, by −180° and +180°, respectively. In FIG. 4, each beam spot is divided into two sections in the radial direction, so as to correspond to the configuration of a two-segment detector which receives each light beam reflected from the optical disk and coverts them into an electrical signal.

FIG. 5 shows a configuration of a tracking error signal generating circuit in accordance with the DPP method. Two signals (signals P and N in the drawing) output from a two-segment detector (main detectors) 10 corresponding to the main beam 100 are supplied to a differencer (difference operator) 16, which outputs a push-pull signal corresponding to the main beam 100 (a main push-pull signal). The main push-pull signal (main PP signal) is then supplied to a differencer 24.

On the other hand, two signals output from a two-segment detector (the first detector) 12 corresponding to the sub-beam 102 (the first sub-beam) are supplied to a differencer 18, which outputs a push-pull signal corresponding to the sub-beam 102 (the first sub push-pull signal). Two signals output from a two-segment detector (the second detectors) 14 corresponding to the sub-beam 104 (the second sub-beam) are supplied to a differencer 20, which outputs a push-pull signal corresponding to the sub-beam 104 (the second sub push-pull signal). The first sub push-pull signal (the first sub PP signal) and the second sub push-pull signal (the second sub PP signal) are then supplied to an adder 22. After the two sub PP signals are added by the adder 22, the resultant signal is amplified by K/2 times by an amplifier 23 so as to match the gain of the sub-beams with that of the main beam, and is also output to the differencer 24. Here, K indicates a ratio of the light amount between the main beam and the sub-beam. Assuming that the main beam:sub-beam=10:11, K=10/11, the main PP signal and the sub PP signal are supplied to the differencer 24, which calculates a difference between these signals and an output signal (a DPP signal) from the differencer 24 can be expressed as follows:

$$DPP\ signal = main\ PP\ signal - K/2$$

(first sub PP signal+second sub PP signal)

Because the minor offset caused by the inclination of the optical disk in the radial direction and the shift of an object lens is equally contained in each PP signal, the offset can be removed by calculating the difference as described above.

After the DPP signal is generated as described above, a predetermined tracking offset signal is added to the DPP signal by an adder 26 and the resultant signal is amplified and then supplied as a tracking error signal to a servo circuit (not shown).

However, the optical axis of a laser beam irradiated from the laser diode (LD) moves depending on the power (more specifically, the temperature), and such a shift of the optical axis further causes the laser spot position on the optical disk to vary between the reproduction time and the recording time. This leads to a problem that accurate tracking cannot be performed during recording, in a structure in which a fixed offset signal is added.

It is of course possible to provide an offset signal for reproduction and an offset signal for recording separately, so that the offset signal for reproduction is added to a DPP signal during data reproduction and the offset signal for recording is added during data recording. This approach, however, does not provide a satisfactory solution when a fixed offset signal is used, because the temperature of the LD is not fixed during recording.

Rather than adding a fixed offset signal for recording to a DPP signal obtained by sampling at the timing of the reproducing power, it is also possible to obtain DPP signals by sampling at the timing of the reproducing power and at the timing of recording power and to generate an offset signal for recording in real time from the difference between these DPP signals. More specifically, it is possible that when recording and tracking data while a main beam and a sub-beam are being irradiated, the reflected component of the sub-beam for tracking control is sampled at the timing of the reproducing power to obtain a push-pull (PP) signal and the reflected light of the sub-beam for tracking control is also sampled at the timing of the recording power to obtain a PP signal, so that an offset signal can be generated in real time from the difference between these two signals. This approach, however, is still disadvantageous in that the circuit scale becomes comparatively large.

SUMMARY OF THE INVENTION

The present invention was conceived in view of the aforementioned problems of the related art and aims to provide an optical disk device capable of performing accurate tracking control during data recording.

An optical disk device in accordance with the present invention comprises a pickup having a laser diode for irradiating a laser beam onto an optical disk; means for generating a tracking error signal based on an amount of return light of a laser beam from the optical disk; offset generating means for generating a tracking offset signal; means for adding the tracking offset signal to the tracking error signal; and means for controlling the pickup in the direction of a track width using the tracking error signal to which the tracking offset signal is added. The offset generating means generates the tracking offset signal in accordance with a driving current of the laser diode.

According to one configuration of the present invention, an optical disk device further comprises storage means for storing a relationship between the driving current of the laser diode and the tracking offset, and the offset generating means reads out, from said storage means, a tracking offset corresponding to the driving current at which power required for data recording is obtained, to thereby generate the tracking offset signal. Further, according to another configuration of the present invention, the offset generating means generates a fixed tracking offset signal when reproducing data and generates a variable tracking offset signal in accordance with the driving current when recording data.

In accordance with another aspect, an optical disk device according to the present invention comprises a pickup having a laser diode for irradiating a laser beam onto an optical disk; means for generating a tracking error signal based on an amount of return light of a laser beam from the optical disk; offset generating means for generating a tracking offset signal; means for adding the tracking offset signal to the tracking error signal; and means for controlling the pickup in the direction of a track width using the tracking error signal to which the tracking error signal is added, and the offset generating means generates the tracking offset signal in accordance with an operating temperature of the laser diode.

According to the present invention, when recording data a tracking offset is adjusted using the driving current of the laser diode, or more directly using an operating temperature of the laser diode. The adjustment of the tracking offset means the adjustment of the tracking position, so that the laser beam can be maintained in an on-track state, even during data recording.

The present invention is widely applicable to a CD-R drive, CD-RW drive, DVD-R drive, DVD-RW drive, DVD-RAM drive, or the like.

While the present invention will be clearly understood with reference to the following description of the embodiments, the scope of the present invention is not limited to the following embodiments.

BRIEF DESCRIPTION OF THE DRAWINGS

These and other objects of the invention will be explained in the description below, in connection with the accompanying drawings, in which.

DETAILED DESCRIPTION OF THE PREFERRED EMBODIMENT

A preferred embodiment of the present invention will be described with reference to the accompanying drawings.

Figure 1:
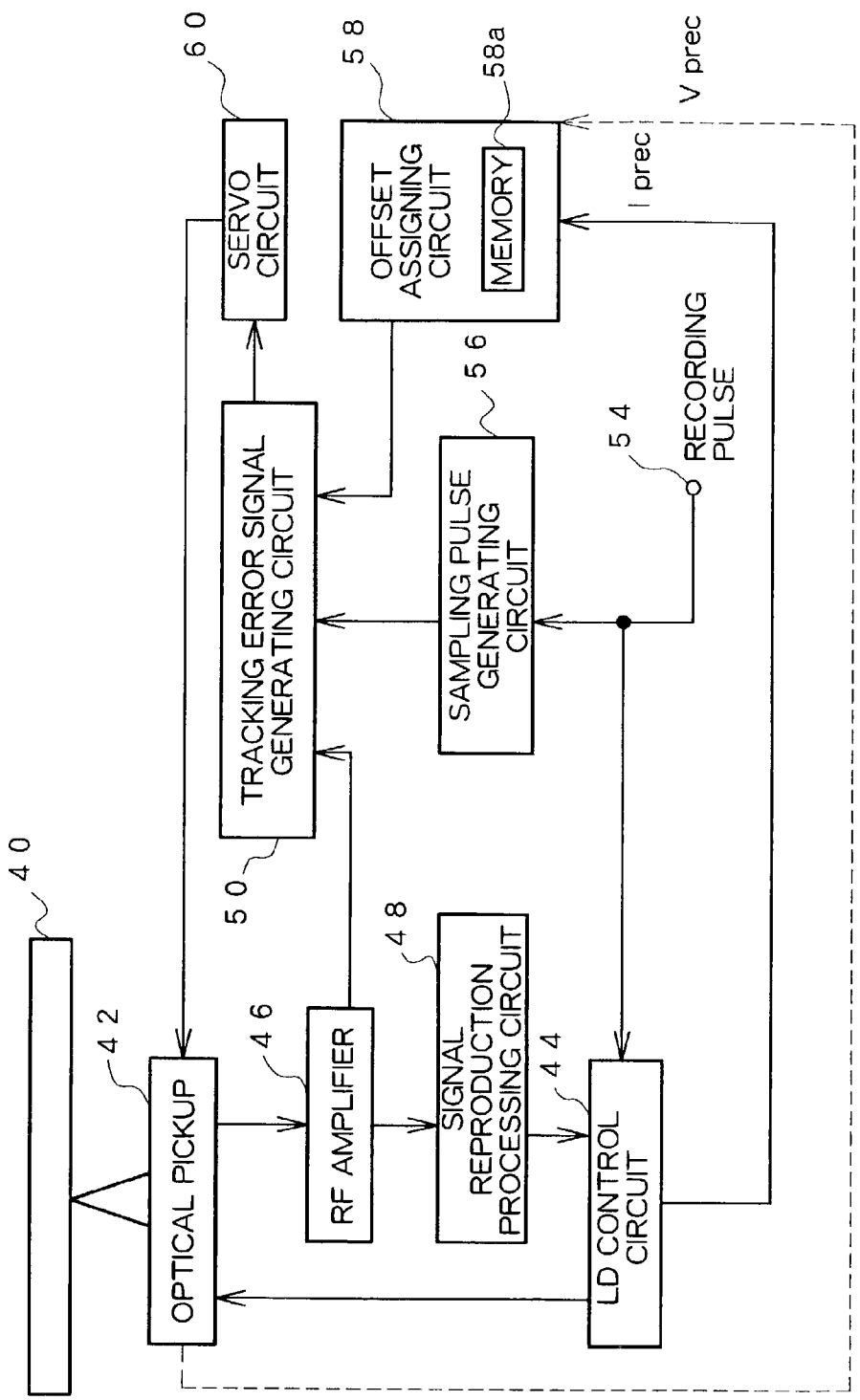
FIG. 1 is a block diagram showing a configuration of an optical disk device.

FIG. 1 is a block diagram showing a configuration of an optical disk device according to the present embodiment. An optical disk 40 capable of recording data, such as a CD-R, is rotationally driven by a spindle motor (not shown).

An optical pickup 42 includes a laser diode (LD) and optics, and an actuator, and is disposed so as to face the optical disk 40.

An LD control circuit 44 drives the LD with reproducing power when reproducing and with recording power when recording (recording power>reproducing power), so that the LD irradiates a laser beam of reproducing or recording power onto the optical disk 40. A recording pulse is supplied from a terminal 54 to the LD control circuit 44, which then generates a drive signal at this recording pulse and supplies the drive signal to the LD.

An RF amplifier 46 amplifies a reproduction RF signal obtained by converting light reflected by the optical disk 40 into an electrical signal using a detector provided within the optical pickup 42, and supplies the amplified signal to a signal reproduction processing circuit 48 and a tracking error signal generating circuit 50.

The signal reproduction processing circuit 48, including an equalizer, a binarizer circuit, a PLL, or the like, binarizes the reproduction RF signal and generates a synchronization clock, and demodulates the reproduction RF signal.

A sampling pulse generating circuit 56, to which a recording pulse is also supplied from the terminal 54, generates a sampling pulse based on the recording pulse and then supplies it to the tracking error signal generating circuit 50. In the present embodiment, a sampling pulse is generated at the timing of the reproducing power during recording, namely at the space timing of a recording pulse.

Figure 5:
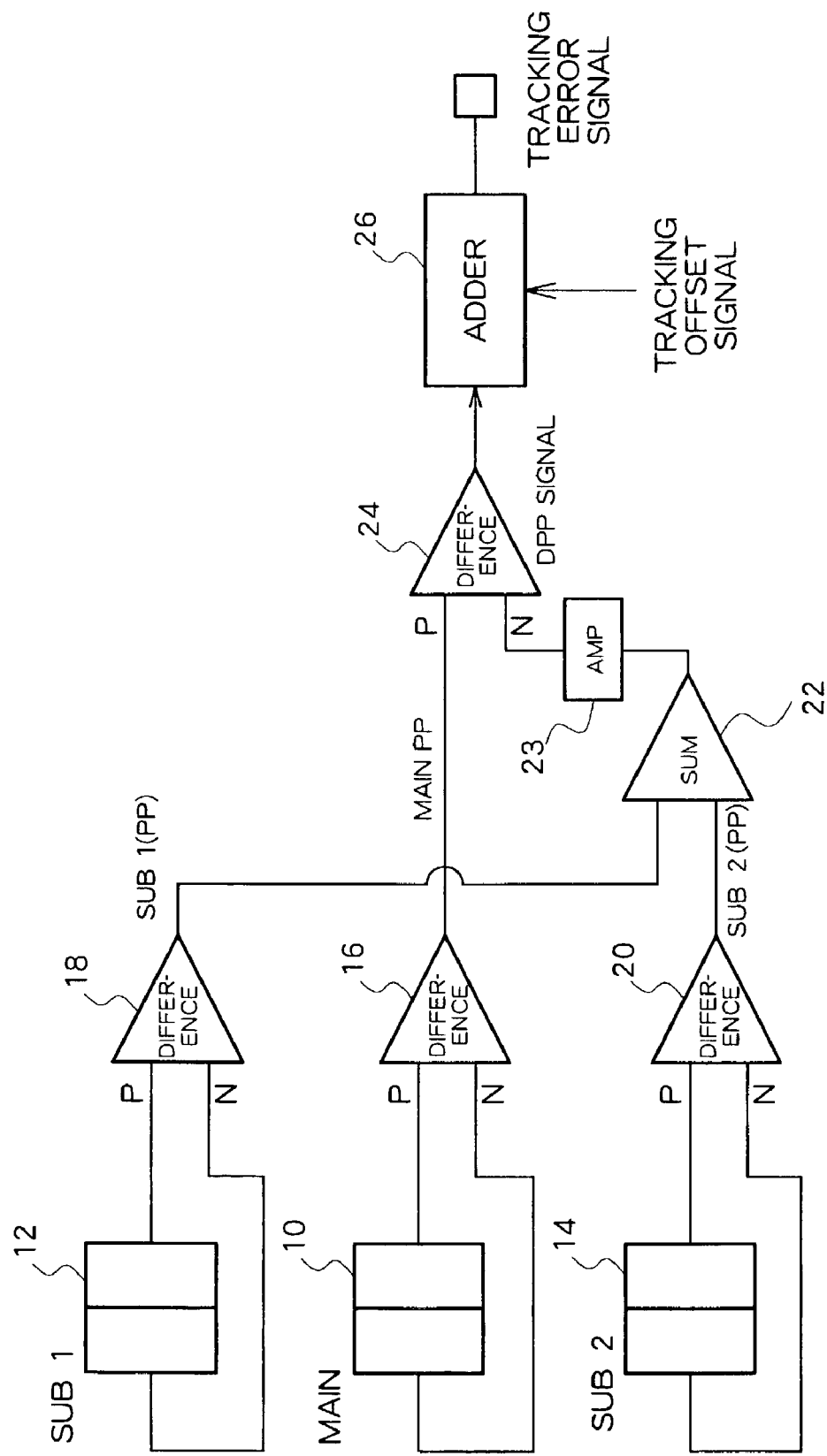
FIG. 5 is a circuit diagram of a tracking error signal generating circuit.

The tracking error signal generating circuit 50 includes a DPP unit and an adder 26 as in the tracking error signal generating circuit shown in FIG. 5. The tracking error signal generating circuit 50 generates a DPP signal using the DPP method and sample-holds the DPP signal at the space timing in accordance with the sampling pulse supplied from the sampling pulse generating circuit 56. An offset signal supplied from an offset assigning circuit 58 is added to the DPP signal, whereby a tracking error signal is generated. The tracking error signal is then supplied to a servo circuit (a tracking servo circuit) 60, which drives the actuator provided within the optical pickup 42 for conducting tracking control.

The offset assigning circuit 58, rather than supplying a fixed value, determines an offset value based on the laser beam driving current at the time of recording, and supplies the offset to the tracking error signal generating circuit 50. In order to achieve this, the optical disk device is configured such that a driving current Iprec is supplied from the LD control circuit 44 to the offset assigning circuit 58. The offset assigning circuit 58 is capable of supplying a fixed offset value to the tracking error signal generating circuit 50 during reproduction and of supplying an offset value which changes in accordance with the driving current Iprec during recording. Further, the offset assigning circuit 58 may use a fixed offset value, which is supplied as a reference when reproducing, to determine the offset for recording as its shift from the reference offset in accordance with the driving current Iprec during recording. In other words, the offset assigning circuit 58 selectively outputs the fixed offset value A for reproducing or an offset value Aprec for recording determined in accordance with the driving current. Alternatively, the offset assigning circuit 58 may selectively output either the fixed offset value A for reproducing or an offset value Aprec for recording which is obtained by adding a shift ΔA determined in accordance with the driving current to the fixed offset value. The above methods can be adopted in combination. The offset Aprec for recording is added to the DPP signal which is sampled at the space timing during recording. (During recording, a space timing of reproducing power is provided between mark timings which correspond to actual recording power).

A method of determining an offset Aprec for recording in the offset assigning circuit 58 will be described. In the following description, it is assumed that the offset Aprec for recording is obtained by adding a shift ΔA from the fixed offset A for reproducing to the fixed offset A, and that the fixed offset A for reproducing is determined as 0 for convenience (although the fixed offset is not 0 actually, in that case, the offset Aprec can be obtained by simply adding the value of the fixed offset to ΔA).

Figure 2:
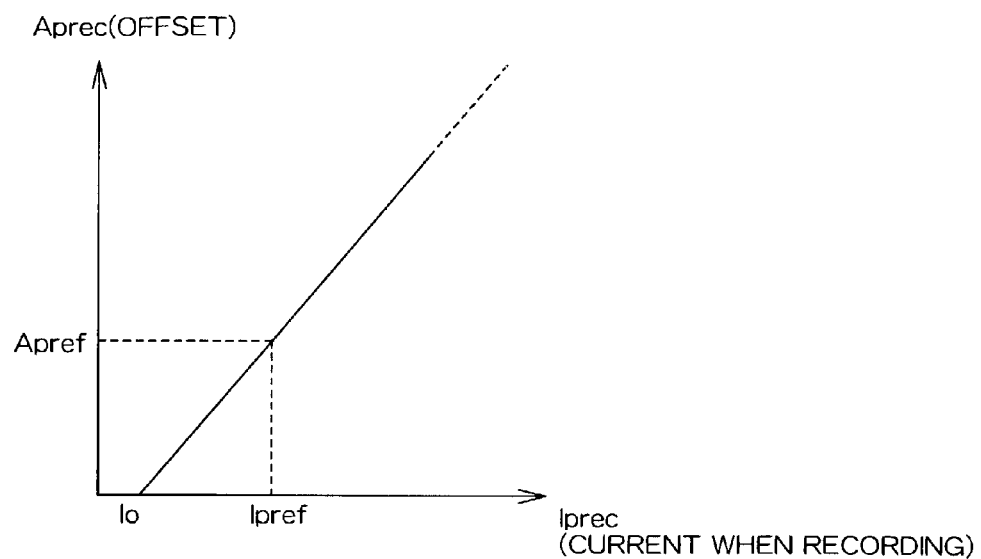
FIG. 2 is a graph showing a relationship between a driving current and a tracking offset when recording data.

FIG. 2 shows a relationship between a driving current Iprec when recording and an offset Aprec. Because any change in the offset when recording is substantially proportional to the temperature, which in turn is substantially proportional to the driving current, the offset is proportional to the driving current. Accordingly, by determining the inclination and intercept of the line shown in FIG. 2, the offset Aprec at an arbitrary driving current Iprec can be determined.

Accordingly, first, in the OPC (Optimum Power Control), test data is recorded in the PCA of the optical disk 40 while variously changing the recording power to thereby determine recording power which provides the best recording quality (for example, β (beta) value), and the driving current value Ipref at which the recording power is optimum and the optimum offset value Apref at this time are detected and plotted. The optimum offset can be obtained in such a manner that the test data is recorded while variously changing the offset value at a certain recording power and the test data is then reproduced with the optimum offset for reproducing, whereby the offset which provides the highest quality is selected. More specifically, the OPC is carried out in the LD control circuit 44 and the signal reproduction processing circuit 48. Namely, an RF signal of the test data is supplied to the signal reproduction processing circuit 48, which calculates β value for each recording power and supplies it to the LD control circuit 44. The LD control circuit 44 sequentially stores the calculated β values in association with the recording power, and selects, as the optimum recording power, the recording power at which the predetermined target β can be obtained. Then, the test data is recorded once again with the selected optimum recording power. At this point, a control signal is supplied to the offset assigning circuit 58 so that the test data is recorded while the offset is varied. After recording the test data, when the test data is reproduced, the offset assigning circuit 58 outputs and supplies the predetermined optimum offset for reproducing to the tracking error signal generating circuit 50. Although in the present embodiment the value for the optimum offset for recording is set at 0 for simplification of description, the optimum offset may be another finite value.

The test data which is recorded with a changing offset is reproduced with the predetermined optimum offset for reproduction, and the reproduction RF signal is then supplied to the signal reproduction processing circuit 48. The signal reproduction processing circuit 48 calculates a β value for each offset, and selects an offset with which the target β can be obtained as the optimum offset. On the other hand, the line shown in FIG. 2 can be uniquely determined by plotting the driving current value I0 corresponding to the reproduction power during the reproduction and the offset value (0) at this time and calculating a line connecting these plot values. The offset assigning circuit 58 stores parameters (such as inclination and intercept) concerning the thus-calculated line in a memory 58a, and then determines the offset Aprec for recording which corresponds to the driving current Iprec based on the driving current Iprec from the LD control circuit 44 and these parameters concerning the line. The offset Aprec thus obtained is added to a DPP signal as already described, and the resultant signal is supplied to the servo circuit 60 as a tracking error signal for recording, for tracking control. Recording of data onto the optical disk 40 is conducted while sequentially changing the optimum recording power using the ROPC (Running Optimum Power Control) in order to maintain the constant reflectivity, rather than at a uniform recording power determined by the OPC. In such a case, the driving current value will vary from the original value, and the offset Aprec will vary accordingly. Further, even at a constant laser power, the driving current varies according to the temperature (as the temperature increases, the driving current increases even at the same laser power), and the offset Aprec will also change in accordance with the change of the driving current value.

It should be obvious that it is possible to determine the line in FIG. 2 using methods other than that described above and to store the parameters defined by the line in the memory 58a. For example, the driving current may be arbitrarily changed so as to provide a plurality of current values, the optimum offset value for each current value calculated, and the combinations of these plurality of driving currents and offset values used to determine the line shown in FIG. 2 using a least-squares method.

It is also possible to determine the reference driving current Ipref and the reference offset value Aref and use an experimentally determined coefficient C. In such a case, the offset value Aprec at an arbitrary driving current can be calculated using the following equation:

$$Aprec = Apref\{1 + C(Iprec - Ipref)/(Ipref)\}.$$

In such a case, the values Ipref, Apref, and C can be stored in the memory 58a of the offset assigning circuit 58. The above equation can be interpreted as compensating for the reference offset value corresponding to the reference driving current based on a difference between the reference driving current and an arbitrary driving current. There are cases wherein the driving current and the offset value, although not in a proportional relationship over a wide range, are substantially proportional when the driving current is limited to the vicinity of the reference driving current. The above equation is effective in such cases.

Further, the offset for recording can also be determined by directly monitoring the operating temperature of the LD, rather than the driving current of the LD. More specifically, a resistor having a thermal coefficient, such as a thermistor, is used, and the voltage at both ends of the thermisistor is monitored, so that an offset value for recording is determined in accordance with the voltage thus detected. The dashed line in FIG. 1 shows such a structure, in which a voltage value Vprec is supplied from the thermistor to the offset assigning circuit 58.

Figure 3:
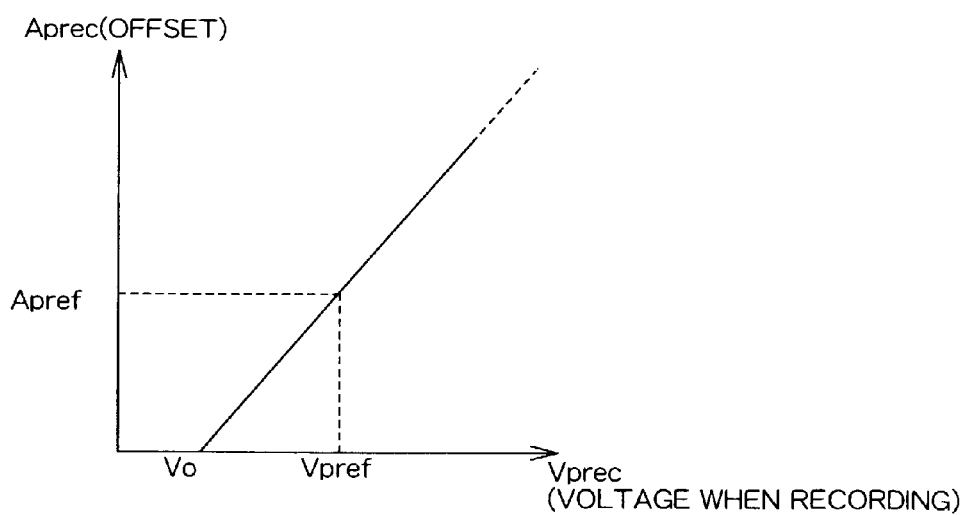
FIG. 3 is a graph showing a relationship between an operating temperature of a laser diode (terminal voltage) and a tracking offset.
Figure 4:
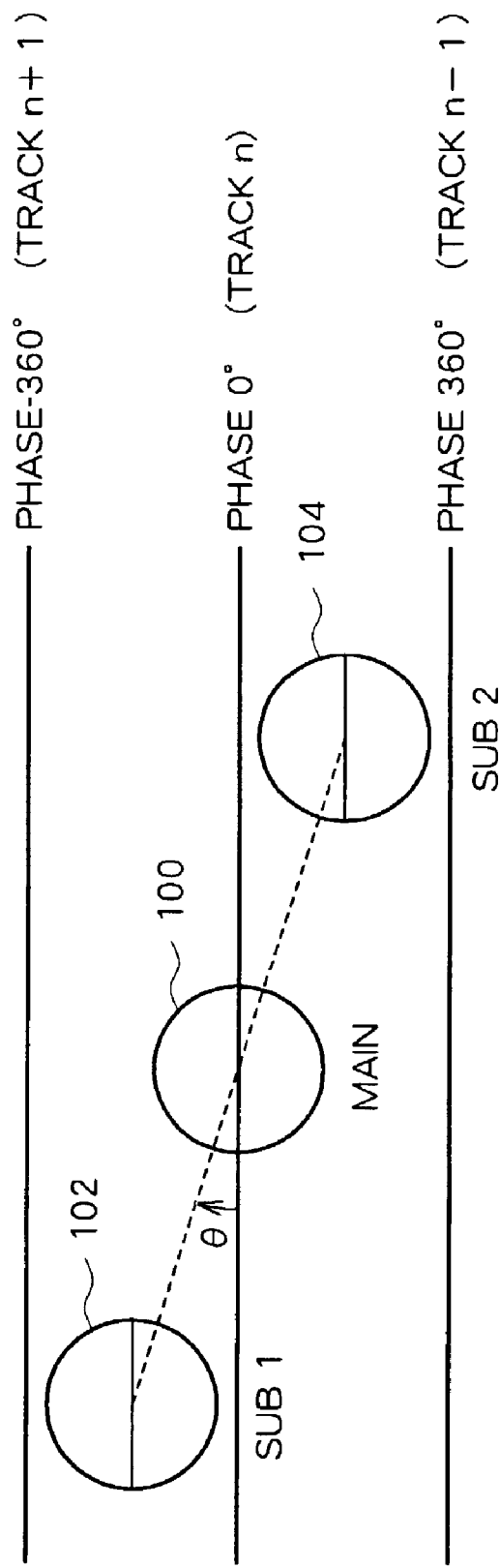
FIG. 4 is a view explaining locations of laser beam spots in the Differential Push-Pull method.

FIG. 3 shows a relationship between the voltage at both ends and the offset Aprec for recording in the above case. The offset value at an arbitrary voltage (temperature) can be determined from the following equation using the reference voltage Vpref and the reference offset value Apref.

$$Aprec = Apref\{1 + R(Vprec - Vpref)/Vpref\}$$

In the above expression, Vprec indicates a voltage at both ends of the thermistor when recording, and R indicates a coefficient which is experimentally specified. These parameters are stored in the memory 58a as indicating a relationship between the operating temperature and the offset.

While the preferred embodiment of the present invention has been described heretofore, the present invention is not limited to the above example and may employ a variety of configurations. For example, although the offset for reproducing is set to 0 in the above example, it is also possible to set the fixed offset for reproducing to A and determine the offset Aprec for recording independently of this offset A and using a proportional relationship between the driving current and the offset value. Of course, the proportional expression for this case can be determined by combinations of a plurality of the driving current and the offset. The data concerning these combinations can be obtained during the OPC process.

Also, while in the above example, a tracking error signal is generated using the DPP in the tracking error signal generating circuit 50, a tracking error signal may be generated using a method other than DPP. Specifically, it is, for example, possible to generate a tracking error signal using an arbitrary method and add to this signal an offset (the offset A for reproducing when reproducing, and the offset Aprec for recording when recording) obtained from the offset assigning circuit 58 in accordance with the present embodiment.

Further, although in the above example the offset value is determined from the driving current because of the proportional relationship between the driving current and the offset value, when such a proportional relationship is not established between the driving current and the offset value due to the characteristics of the optical disk 40 and the device, the data concerning combinations of a plurality of driving currents and offset values may be stored in the memory 58a of the offset assigning circuit 58 and the offset value at an arbitrary driving current may be determined by interpolation of these data.

While the preferred embodiment of the present invention has been described using specific terms, such description is for illustrative purposes only, and it is to be understood that changes and variations may be made without departing from the spirit or scope of the appended claims.

What is claimed is:

1. An optical disk device comprising:
a pickup having a laser diode for irradiating a laser beam onto an optical disk;
means for generating a tracking error signal based on an amount of light reflected from the optical disk;
offset generating means for generating a tracking offset signal;
means for adding the tracking offset signal to the tracking error signal; and
means for controlling the pickup in the direction of a track width using the tracking error signal to which the tracking offset signal is added,
wherein said offset generating means generates the tracking offset signal in accordance with a driving current of the laser diode, and corrects a predetermined reference tracking offset based on a difference between the driving current and a predetermined reference driving current to generate the tracking offset signal.

2. An optical disk device comprising:
a pickup having a laser diode for irradiating a laser beam onto an optical disk;
means for generating a tracking error signal based on an amount of light reflected from the optical disk;
offset generating means for generating a tracking offset signal;
means for adding the tracking offset signal to the tracking error signal;
means for controlling the pickup in the direction of a track width using the tracking error signal to which the tracking offset signal is added;
storage means for storing a relationship between the driving current of the laser diode and the tracking offset;
means for recording test data on a predetermined area of said optical disk while changing recording power or the driving current and further changing the tracking offset;
means for evaluating the quality of a reproduction signal of the test data; and
means for selecting the optimum tracking offset corresponding to the recording power or the driving current based on the quality of the reproduction signal,
wherein said offset generating means generates the tracking offset signal in accordance with a driving current of the laser diode, and reads out, from said storage means, a tracking offset corresponding to the driving current of a power required for recording data, to thereby generate the tracking offset signal, and wherein a relationship between the recording power or the driving current and the optimum tracking offset selected by said selecting means is stored as said relationship.

3. An optical disk device comprising:
an optical pickup having a laser diode for irradiating a laser beam of recording power onto an optical disk when recording data and irradiating a laser beam of reproducing power when reproducing data, and a photodetector;
a tracking error signal generating circuit for generating a tracking error signal from light reflected from the optical disk;
an offset assigning circuit for generating a tracking offset signal to be added to the tracking error signal;
a servo circuit for driving said optical pickup in the direction of a track width of said optical disk using the tracking error signal to which the tracking offset signal is added; and
a laser diode driving circuit for driving the laser diode,
wherein said offset assigning circuit generates the tracking offset signal in accordance with driving current data obtained from said laser diode driving circuit, and corrects the optimum tracking offset signal when reproducing data in accordance with a difference between driving current data when reproducing data and driving current data when recording data to generate the tracking offset signal.

* * * * *